United States Patent
Aab et al.

(10) Patent No.: US 9,945,958 B1
(45) Date of Patent: Apr. 17, 2018

(54) HYBRID CIVILIAN AND MILITARY POSITIONING SYSTEM

(71) Applicants: Rockwell Collins, Inc., Cedar Rapids, IA (US); Sai Kalyanaraman, Marion, IA (US)

(72) Inventors: Steven D. Aab, Robins, IA (US); John J. Weger, Ely, IA (US); Mahesh Surathu

(73) Assignee: Rockwell Collins, Inc., Cedar Rapids, IA (US)

( * ) Notice: Subject to any disclaimer, the term of this patent is extended or adjusted under 35 U.S.C. 154(b) by 803 days.

(21) Appl. No.: 14/471,852

(22) Filed: Aug. 28, 2014

(51) Int. Cl.
*G01S 19/18* (2010.01)
*G01S 19/21* (2010.01)

(52) U.S. Cl.
CPC ............ *G01S 19/215* (2013.01); *G01S 19/18* (2013.01); *G01S 19/21* (2013.01)

(58) Field of Classification Search
CPC ........ G01S 19/18; G01S 19/21; G01S 19/215; H04B 7/0617
See application file for complete search history.

(56) References Cited

U.S. PATENT DOCUMENTS

| | | | | |
|---|---|---|---|---|
| 2005/0146459 A1* | 7/2005 | Dentinger | ............... | G01S 19/18 342/357.58 |
| 2008/0268775 A1* | 10/2008 | Bishop | ................. | H04B 7/0617 455/13.3 |
| 2009/0135054 A1* | 5/2009 | Dentinger | ............... | G01S 19/18 342/357.59 |
| 2014/0035783 A1* | 2/2014 | Contarino | ............... | G01S 19/21 342/357.59 |
| 2014/0375500 A1* | 12/2014 | Wang | ...................... | G01S 19/21 342/357.59 |

OTHER PUBLICATIONS

Cyclic redundancy check (CRC). (1999). Focal Dictionary of Telecommunications, focal Press. London, UK: Routledge. Retrieved from http://search.credoreference.com/content/entry/bhfldt/cyclic_redundancy_check_crc/0.*

Forward error correction (FEC). (1999). Focal Dictionary of Telecommunications, Focal press. London, UK: Routledge. Retrieved from http://search.credoreference.com/content/entry/bhfldt/forward_error_correction_fec/0.*

(Continued)

*Primary Examiner* — Bernarr E Gregory
*Assistant Examiner* — Fred H Mull
(74) *Attorney, Agent, or Firm* — Angel N. Gerdzhikov; Donna P. Suchy

(57) ABSTRACT

Hybrid systems capable of performing both civilian and military GPS functions with hardware-enforced separation of data boundaries are disclosed. A hybrid system may include a first position data processor configured to generate a first set of position data based on signals received from a satellite navigation system and signals received from a digital antenna. The hybrid system may also include a second position data processor configured to generate a second set of position data based on signals received from the satellite navigation system and signals received from the digital antenna. The hybrid system may further provide a communication interface established between the first position data processor and the second position data processor.

20 Claims, 1 Drawing Sheet

(56) References Cited

OTHER PUBLICATIONS

Handler. (2010). Dictionary of Computing (6th ed.). London, UK: Bloomsbury. Retrieved from http://search.credoreference.com/content/entry/abcomp/handler/0.*

Antenna. (2017). The Columbia Encyclopedia (7th ed.). New York, NY: Columbia University Press. Retrieved from http://search.credoreference.com/content/entry/columency/antenna/0.*

* cited by examiner

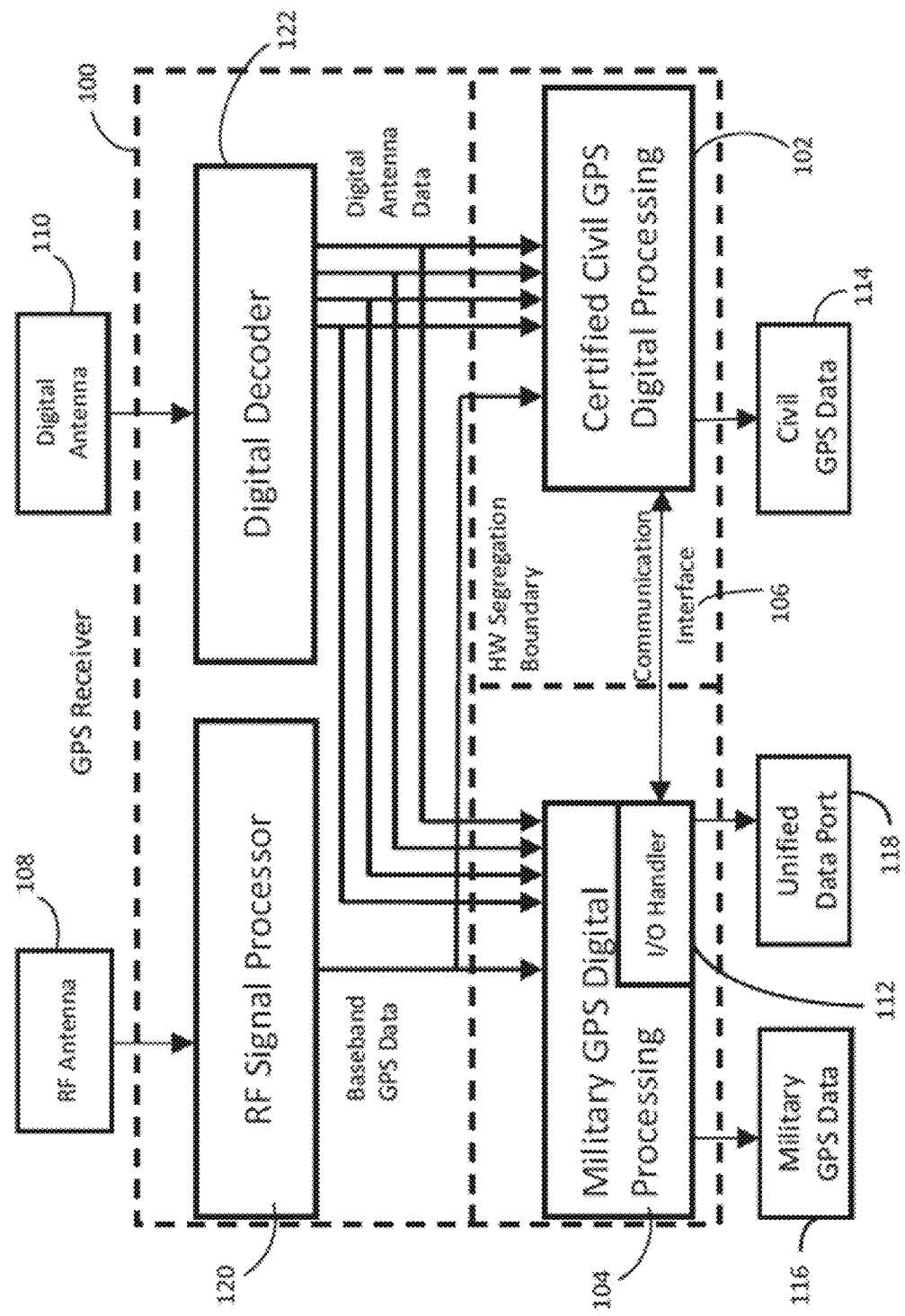

HYBRID CIVILIAN AND MILITARY POSITIONING SYSTEM

BACKGROUND

Positioning systems, such as the Global Positioning System (GPS), utilize satellites to broadcast signals to enable receivers to determine location and synchronized time. A positioning system may support both military and civilian applications. It is noted that military and civilian applications may have different operating standards. For example, a certain level of security may need to be established for military applications. In another example, civilian applications may need to satisfy a certain assurance level specified by an aviation administration for civilian airborne systems, which may not apply to military aircrafts.

SUMMARY

Embodiments of the inventive concepts disclosed herein are directed to an apparatus. The apparatus includes a first position data processor configured to generate a first set of position data based on signals received from a satellite navigation system and signals received from a digital antenna. The apparatus also includes a second position data processor configured to generate a second set of position data based on signals received from the satellite navigation system and signals received from the digital antenna. The second position data processor is further configured to control operations of the digital antenna. The apparatus provides a communication interface established between the first position data processor and the second position data processor. The communication interface is configured to facilitate transmission of the first set of position data from the first position data processor to the second position data processor, or transmission of digital antenna control information from the second position data processor to the first position data processor.

In one aspect, the second position data processor is configured to control the anti-jamming operations provided by the digital antenna. The transmission of digital antenna control information from the second position data processor to the first position data processor includes the transmission of digital antenna anti-jamming control information from the second position data processor to the first position data processor.

A further embodiment of the present disclosure is also directed to an apparatus. The apparatus includes a radio frequency signal processor configured to process signals received from a satellite navigation system and a digital decoder configured to process signals received from a digital antenna. The apparatus also includes a first position data processor configured to generate a first set of position data based on signals processed by the radio frequency signal processor and signals processed by the digital decoder. The apparatus further includes a second position data processor configured to generate a second set of position data based on signals processed by the radio frequency signal processor and signals processed by the digital decoder, wherein the second position data processor is physically separated from the first position data processor, and wherein the second position data processor is further configured to control anti-jamming operations provided by the digital antenna. The apparatus provides a communication interface established between the first position data processor and the second position data processor. The communication interface is configured to facilitate transmission of the first set of position data from the first position data processor to the second position data processor or transmission of digital antenna anti-jamming control information from the second position data processor to the first position data processor.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying FIGURE in which:

The FIGURE is a block diagram depicting a hybrid GPS receiver according to an embodiment of the inventive concepts disclosed herein.

DETAILED DESCRIPTION

Reference will now be made in detail to exemplary embodiments of the inventive concepts disclosed herein, examples of which are illustrated in the accompanying drawings.

The need for providing protected civilian aviation capabilities for military GPS receivers is becoming a necessity as the demand for access to prioritized routes for Performance Based Navigation (PBN) and Space Based Augmentation System (SBAS) Localizer Performance with Vertical Guidance (LPV) increases. One of the challenges is to provide a civilian aviation capability that: 1) does not compromise the required security level of a military GPS receiver, and 2) is still economically certifiable to civilian standards. For example, compared to military standards, current civilian standards require more stringent Design Assurance Levels (DAL) per RTCA/DO-178 for software and RTCA/DO-254 for complex hardware. The civilian aviation capability provided for a military GPS receiver may therefore need to satisfy both the civilian standards for assurance levels, and to simultaneously maintain legacy military capability and respect security boundaries.

Embodiments of the inventive concepts disclosed herein are directed to hybrid systems capable of performing both civilian and military GPS functions with hardware-enforced separation of data boundaries.

Referring to the FIGURE, a block diagram depicting a hybrid GPS receiver 100 according to an embodiment of the inventive concepts disclosed herein is shown. The hybrid GPS receiver 100 may include a first GPS processor 102 and a second GPS processor 104. The first GPS processor 102 and the second GPS processor 104 are physically separate processors co-located within the same hybrid GPS receiver 100. In some embodiments, the first GPS processor 102 and the second GPS processor 104 have different data processing standards. For example, the first GPS processor 102 may be configured for providing GPS data processing for civilian applications and the second GPS processor 104 may be configured for providing GPS data processing for military applications.

Both the first GPS processor 102 and the second GPS processor 104 may be communicatively coupled with a radio frequency (RF) signal processor 120, which may be configured to receive signals from an RF antenna 108 and provide baseband GPS data to the first GPS processor 102 and the second GPS processor 104. Both the first GPS processor 102 and the second GPS processor 104 may also be communicatively coupled with a digital decoder 122, which may be configured to receive digital signals from a digital antenna 110 and provide digital antenna data to the first GPS processor 102 and the second GPS processor 104. The digital antenna 110 may be utilized to provide functions such as digital anti-jamming to improve the accuracy of the baseband GPS data. The first GPS processor 102 and the second GPS processor 104 may each independently process the baseband GPS data received from the RF signal processor 120 and the digital antenna data received from the digital decoder 122 to independently generate GPS data.

In some embodiments, the hybrid GPS receiver 100 may be utilized to provide position data for an aviation system (e.g., an aircraft). The first GPS processor 102 may process the received data and provide a civilian GPS-derived solution that is robust against radio frequency interference and multipath. It is contemplated that the first GPS processor 102 may implement any civilian GPS solution that has been developed and certified to RTCA/DO-178B, Design Assurance Level A, to satisfy the current civilian standards. It is to be understood, however, that the civilian aviation standards presented above are merely exemplary, and the specific implementations of the first GPS processor 102 may vary without departing from the broad scope of the inventive concepts disclosed herein.

The second GPS processor 104, on the other hand, may provide capabilities that are unavailable to the first GPS processor 102. For instance, the second GPS processor 104 may be utilized for military applications, and may therefore be able to control the operations of the digital antenna 110. In some embodiments, the second GPS processor 104 may be able to control the anti-jamming functions provided by the digital antenna 110. The second GPS processor 104 may also be able to steer the antenna beam of the digital antenna 110 (e.g., when coupled to a Controlled Radiation Pattern Antenna, or CRPA), as well as other control capabilities that may only be available to military applications.

The second GPS processor 104 may also be able to access different types of GPS signals that may not be accessible to the first GPS processor 102. For instance, the original GPS design provides two ranging codes: the Coarse/Acquisition (C/A) code, which is freely available to the public, and the restricted Precision (P) code, usually reserved for military applications. As GPS continues to evolve, additional GPS signals such as the encrypted P-code, Military (M) code are also being developed. It is noted that P-code, encrypted P-code, M-code (may be collectively referred to as secure GPS signals) may only be processed by the second GPS processor 104. It is therefore important to ensure that no opportunity exists in the hybrid GPS receiver 100 for the secure GPS signals to be delivered from the second GPS processor 104 to the first GPS processor 102.

In some embodiments, physical hardware separation of the first GPS processor 102 and the second GPS processor 104 is enforced to establish a hardware-enforced security boundary isolating the two GPS processors 102 and 104. Data communication between the first GPS processor 102 and the second GPS processor 104 is restricted to an interface 106 established between the first GPS processor 102 and the second GPS processor 104. The interface 106 effectively provides protected civilian aviation capabilities for the second GPS processor 104 without any extensive modifications to the first and second GPS processors 102 and 104. In some embodiments, GPS data generated by the first GPS processor 102 may be protected utilizing an error-detecting code (e.g., a cyclic redundancy check) prior to being provided to an input/output (I/O) handler 112 of the second GPS processor 104 via the interface 106. The I/O handler 112 may be configured to operate as a pass-through I/O handler for data received from the first GPS processor 102 in order to preserve its data integrity.

In addition to providing protected civilian aviation capabilities for the second (or military) GPS processor 104, another advantage provided by the interface 106 is the ability to provide digitized beams and associated commands controllable by the second GPS processor 104 to the first GPS processor 102. For instance, the second GPS processor 104 may have the abilities to control the digital antenna 110 for digital anti-jamming operations, map authentic GPS satellites to digital antenna inputs, and distinguish non-GPS satellite signals based on their proximities to GPS satellite vectors. The first (or civilian) GPS processor 102, however, may not be equipped, authorized, or certified to perform such operations independently by itself. It may therefore be beneficial to share some of the digital anti-jamming capabilities readily available to the second GPS processor 104 with the first GPS processor 102. In some embodiments, the first GPS processor 102 may receive some of the digital antenna 110 anti-jamming control information from the second GPS processor 104 via the interface 106. This allows the first GPS processor 102 to be aware of how the digital antenna 110 is being controlled (which in turn allows the first GPS processor 102 to process the data received from the digital antenna 110 in a more meaningful manner) without providing the first GPS processor 102 the abilities to actually control the digital antenna 110 (which helps maintaining the security boundaries between civilian and military applications). It is contemplated that other types of commands controllable by the second GPS processor 104 may also be shared with the first GPS processor 102 via the interface 106 without departing from the broad scope of the inventive concepts disclosed herein.

It is contemplated that the output data generated by the first GPS processor 102 and the second GPS processor 104 may be provided to a downstream process in various different ways. In some embodiments, separate data streams may be provided utilizing dedicated ports (e.g., data port 114 for civilian applications and data port 116 for military applications) for processes that require either the civilian GPS data or the military GPS data. Alternatively and/or additionally, a unified data port 118 may be utilized to provide both civilian GPS data and military GPS data. The civilian GPS data may be protected utilizing an error-detecting code to provide an integrity check that assures the civilian GPS data is not corrupted or modified in any way during handling by the I/O handler 112 of the second GPS processor 104.

It is contemplated that the specific references to "civilian" and/or "military" applications as described above are merely exemplary. The term "civilian" generally refers to data processing that may be assured to a certain established level, but may not necessarily be secured. The term "military" generally refers to data processing that may be secured and encrypted, but may not necessarily satisfy a certain assurance level. It is to be understood that while the examples above depict the first GPS processor 102 as the processor that is configured for providing GPS data processing for civilian applications and the second GPS processor 104 as the processor that is configured for providing GPS data processing for military applications, such depictions are merely exemplary. The first GPS processor 102 and the second GPS processor 104 may refer to any GPS processors that have different data processing standards, whether such standards are established for civilian/military purposes or not. Further, embodiments of hybrid GPS receivers according to the inventive concepts disclosed herein may include any desired number of processors, provided that at least one first GPS processor 102 and at least one second GPS processor 104 are included as described herein.

It is also noted that the specific references to the "global positioning system" or "GPS" as described above are merely exemplary. The term "global positioning system" may generally refer to a satellite navigation system without departing from the broad scope of the inventive concepts disclosed herein.

It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. An apparatus, comprising:
    a first position data processor configured to generate a first set of position data based on radio frequency (RF) signals received from a satellite navigation system and digital signals received from a digital beamforming antenna;
    a second position data processor configured to generate a second set of position data based on the RF signals received from the satellite navigation system and the digital signals received from the digital beamforming antenna, the second position data processor further configured to control steering operations of the digital beamforming antenna information and generate digital antenna control information; and
    a communication interface established between the first position data processor and the second position data processor configured to facilitate transmission of a portion of the digital antenna control information from the second position data processor to the first position data processor, wherein the first position data processor and the second position data processor have a separate configuration such that communications between the first position data processor and the second position data processor are restricted to the communication interface.

2. The apparatus of claim 1, wherein the first position data processor and the second position data processor are physically separated hardware processors, and wherein the first position data processor and the second position data processor are each configured to independently process RF signals received from the satellite navigation system and digital signals received from the digital beamforming antenna.

3. The apparatus of claim 1, wherein the first position data processor is configured to generate the first set of position data according to a first data standard and the second position data processor is configured to generate the second set of position data according to a second data standard different from the first data standard.

4. The apparatus of claim 1, wherein the communication interface is further configured to facilitate transmission of the first set of position data from the first position data processor to the second position data processor, the first set of position data transmitted from the first position data processor to the second position data processor being received at an input/output (I/O) handler of the second position data processor, and wherein the I/O handler operates as a pass-through I/O handler without modifying the first set of position data.

5. The apparatus of claim 1, wherein the portion of digital antenna control information transmitted from the second position data processor to the first position data processor includes anti-jamming control information for the digital beamforming antenna.

6. The apparatus of claim 1, wherein the first position data processor is certifiable to an established civilian aviation standard.

7. The apparatus of claim 1, wherein the second position data processor is configured to satisfy a required security level for a military application.

8. An apparatus, comprising:
    a first position data processor configured to generate a first set of position data based on radio frequency (RF) signals received from a satellite navigation system and digital signals received from a digital beamforming antenna;
    a second position data processor configured to generate a second set of position data based on the RF signals received from the satellite navigation system and the digital signals received from the digital beamforming antenna, the second position data processor further configured to control anti-jamming operations provided by the digital beamforming antenna and generate anti-jamming control information; and
    a communication interface established between the first position data processor and the second position data processor configured to facilitate transmission of a portion of the digital antenna anti-jamming control information from the second position data processor to the first position data processor, wherein the first position data processor and the second position data processor have a separate configuration such that communications between the first position data processor and the second position data processor are restricted to the communication interface.

9. The apparatus of claim 8, wherein the first position data processor and the second position data processor are physically separated hardware processors, and wherein the first position data processor and the second position data processor are each configured to independently process RF signals received from the satellite navigation system and digital signals received from the digital beamforming antenna.

10. The apparatus of claim 8, wherein the first position data processor is configured to generate the first set of position data according to a first data standard and the second position data processor is configured to generate the second set of position data according to a second data standard different from the first data standard.

11. The apparatus of claim 8, wherein the communication interface is further configured to facilitate transmission of the first set of position data from the first position data processor to the second position data processor, the first set of position data transmitted from the first position data processor to the second position data processor being received at an input/output (I/O) handler of the second position data processor, and wherein the I/O handler operates as a pass-through I/O handler without modifying the first set of position data.

12. The apparatus of claim 11, wherein the first set of position data is protected utilizing an error-detecting code prior to the transmission from the first position data processor to the second position data processor.

13. The apparatus of claim 8, wherein the first position data processor is certifiable to an established civilian aviation standard.

14. The apparatus of claim 8, wherein the second position data processor is configured to satisfy a required security level for a military application.

15. An apparatus, comprising:
a radio frequency (RF) signal processor configured to process RF signals received from a satellite navigation system;
a digital decoder configured to process digital signals received from a digital beamforming antenna;
a first position data processor associated with a first data standard and configured to generate a first set of position data based on the RF signals processed by the RF signal processor and the digital signals processed by the digital decoder;
a second position data processor associated with a second data standard and configured to generate a second set of position data based on the RF signals processed by the RF signal processor and the digital signals processed by the digital decoder, the second position data processor further configured to control steering and anti-jamming operations provided by the digital beamforming antenna and generate steering and anti-jamming control information; and
a communication interface established between the first position data processor and the second position data processor configured to facilitate transmission of a portion of the steering and anti-jamming control information from the second position data processor to the first position data processor, wherein the first position data processor and the second position data processor have a separate configuration such that communications between the first position data processor and the second position data processor are restricted to the communication interface.

16. The apparatus of claim 15, wherein the communication interface comprises a protected aviation communication interface, wherein the first position data processor comprises an unsecured and assured data processor that is configured to generate the first set of position data according to the first data standard and the second position data processor comprises a secured and encrypted data processor that is configured to generate the second set of position data according to the second data standard different from the first data standard, and wherein the first position data processor and the second position data processor comprise a single hybrid receiver.

17. The apparatus of claim 15, wherein the communication interface is further configured to facilitate transmission of the first set of position data from the first position data processor to the second position data processor, the first set of position data transmitted from the first position data processor to the second position data processor being received at an input/output (I/O) handler of the second position data processor, and wherein the I/O handler operates as a pass-through I/O handler without modifying the first set of position data.

18. The apparatus of claim 17, wherein the first set of position data is protected utilizing an error-detecting code prior to the transmission from the first position data processor to the second position data processor.

19. The apparatus of claim 15, wherein the first position data processor is certifiable to an established civilian aviation standard.

20. The apparatus of claim 15, wherein the second position data processor is configured to satisfy a required security level for a military application.

\* \* \* \* \*